United States Patent
Hong

(10) Patent No.: US 12,400,169 B2
(45) Date of Patent: Aug. 26, 2025

(54) CONTROL APPARATUS FOR AIRCRAFT AND CONTROL METHOD THEREFOR

(71) Applicant: THIS IS ENGINEERING INC., Seongnam-si (KR)

(72) Inventor: Yoo Jung Hong, Yongin-si (KR)

(73) Assignee: THIS IS ENGINEERING INC., Seongnam-si (KR)

( * ) Notice: Subject to any disclaimer, the term of this patent is extended or adjusted under 35 U.S.C. 154(b) by 0 days.

(21) Appl. No.: 18/267,482

(22) PCT Filed: Nov. 17, 2021

(86) PCT No.: PCT/KR2021/016901
§ 371 (c)(1),
(2) Date: Jun. 15, 2023

(87) PCT Pub. No.: WO2022/131584
PCT Pub. Date: Jun. 23, 2022

(65) Prior Publication Data
US 2024/0062135 A1   Feb. 22, 2024

(30) Foreign Application Priority Data
Dec. 15, 2020  (KR) .................. 10-2020-0175747

(51) Int. Cl.
*G06Q 10/08*   (2024.01)
*G08G 5/34*    (2025.01)
(Continued)

(52) U.S. Cl.
CPC ............... *G06Q 10/08* (2013.01); *G08G 5/34* (2025.01); *G08G 5/55* (2025.01); *G08G 5/57* (2025.01);
(Continued)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

2015/0301150 A1* 10/2015 Stuckman .......... G06Q 10/0833
                                                       342/407
2017/0090271 A1*  3/2017 Harris ............. G06Q 10/08355
(Continued)

FOREIGN PATENT DOCUMENTS

KR  10-2016-0060374 A  5/2016
KR  10-2016-0082195 A  7/2016
(Continued)

OTHER PUBLICATIONS

Kuru, Kaya, et al. "Analysis and optimization of unmanned aerial vehicle swarms in logistics: An intelligent delivery platform." Ieee Access 7 (2019): 15804-15831. (Year: 2019).*
(Continued)

*Primary Examiner* — Emmett K. Walsh
(74) *Attorney, Agent, or Firm* — invenstone patent LLC; Daniel J Chung

(57) ABSTRACT

The present invention relates to a control method for a control apparatus for an aircraft, the control apparatus including a communication unit and a processor. The control method includes receiving an address of a delivery location to which a delivery product is to be delivered, and controlling an aircraft by means of the communication unit to deliver the delivery product to the delivery location, in which the controlling of the aircraft by means of the communication unit includes selecting, on the basis of the address, any one of a plurality of delivery criteria that defines an area into which the aircraft is to unload the delivery product, establishing a delivery area and a flight (Continued)

lane to the delivery area on the basis of the delivery criterion, controlling the aircraft to allow the aircraft to fly along the flight lane, and controlling the aircraft to unload the delivery product into the delivery area when the aircraft reaches the delivery area.

19 Claims, 19 Drawing Sheets

(51) Int. Cl.
    *G08G 5/55* (2025.01)
    *G08G 5/57* (2025.01)
    *B64U 101/30* (2023.01)
    *B64U 101/60* (2023.01)
    *G05D 1/00* (2006.01)

(52) U.S. Cl.
    CPC ...... *B64U 2101/30* (2023.01); *B64U 2101/60* (2023.01); *B64U 2201/00* (2023.01); *G05D 1/102* (2013.01)

(56) References Cited

U.S. PATENT DOCUMENTS

| | | |
|---|---|---|
| 2018/0121876 A1 | 5/2018 | Doherty et al. |
| 2019/0012640 A1* | 1/2019 | Ferguson ............. G06Q 10/083 |
| 2019/0041852 A1* | 2/2019 | Schubert ............ G06Q 10/0836 |
| 2019/0147401 A1 | 5/2019 | Bash et al. |
| 2019/0147751 A1 | 5/2019 | Sasao |
| 2019/0332998 A1 | 10/2019 | Ruxton |
| 2021/0174301 A1* | 6/2021 | Abeywardena ...... G05D 1/0676 |
| 2021/0201258 A1* | 7/2021 | Perez ................. G06Q 10/0833 |

FOREIGN PATENT DOCUMENTS

| | | |
|---|---|---|
| KR | 10-1990886 B1 | 6/2019 |
| KR | 10-2020-0044691 A | 4/2020 |

OTHER PUBLICATIONS

An Extended European Search Report (issued by the EPO on Oct. 1, 2024 for EP Application No. 21906889).

* cited by examiner

CONTROL APPARATUS FOR AIRCRAFT AND CONTROL METHOD THEREFOR

CROSS-REFERENCE TO RELATED APPLICATIONS

This application is a National Stage filing under 35 U.S.C. 371 of International Application No. PCT/KR2021/016901, filed on Nov. 17, 2021, which claims the benefit of earlier filing date and right of priority to Korean Application No. 10-2020-0175747 filed on Dec. 15, 2020 in the Korean Intellectual Property Office, the contents of which are all hereby incorporated by reference herein in their entirety.

BACKGROUND OF THE DISCLOSURE

Technical Field

The present invention relates to a control apparatus for an aircraft and a control method therefor.

Background Art

An aircraft refers to a transportation means capable of moving persons or luggage by using kinetic energy while flying through the air. Representative examples of the aircraft include airplanes, helicopters, multicopters, airships, and unmanned aircraft.

For the safety and convenience of users using the aircraft, the aircraft is equipped with various types of sensors and devices, and the functions of the aircraft are diversified.

The functions of the aircraft may be classified into a convenience function for improving the convenience of a pilot, and a safety function for improving the safety of the pilot and/or occupants.

Structural components and/or software components of the aircraft are improved to support and improve the functions of the aircraft. For example, autonomous aircraft have been developed which may automatically fly to a destination without the intervention of the pilot.

SUMMARY OF THE DISCLOSURE

An object of the present invention is to solve the above-mentioned problems and other problems.

One object of the present invention is to provide a control apparatus for an aircraft and a control method therefor, which controls an aircraft to quickly and accurately deliver a delivery product to a delivery location.

To achieve the above-mentioned object, an embodiment of the present invention provides a control apparatus for an aircraft and a control method therefor. Further, the exemplary embodiment of the present invention provides an aircraft including the control apparatus for an aircraft.

As an example, a control method for a control apparatus for an aircraft including a communication unit and a processor includes: receiving an address of a delivery location to which a delivery product is to be delivered; and controlling an aircraft by means of the communication unit to deliver the delivery product to the delivery location, in which the controlling of the aircraft by means of the communication unit includes: selecting, on the basis of the address, any one of a plurality of delivery criteria that defines an area into which the aircraft is to unload the delivery product; establishing a delivery area and a flight lane to the delivery area on the basis of the delivery criterion; controlling the aircraft so that the aircraft flies along the flight lane; and controlling the aircraft to unload the delivery product into the delivery area when the aircraft reaches the delivery area.

According to the embodiment, the controlling of the aircraft by means of the communication unit may include: acquiring a map image including the delivery location; dividing at least one area of the map image into a plurality of areas; and establishing, on the basis of the delivery criterion, at least one of the plurality of areas to the delivery area.

According to the embodiment, the control method may include: receiving sensing information related to the delivery area sensed by a sensor mounted in the aircraft; reestablishing the delivery area to a second area from a first area when the sensing information satisfies a reference condition; and controlling the aircraft to unload the delivery product into the second area instead of the first area.

According to the embodiment, the reestablishing of the delivery area to the second area may include: exploring a predetermined area, which satisfies an unloading condition of the delivery product, by using the sensing information; and reestablishing the predetermined area to the second area.

According to the embodiment, the control method may include: establishing a new flight lane by using the sensing information when the predetermined area is not explored; and controlling the aircraft so that the aircraft flies along the new flight lane.

According to the embodiment, the predetermined area may be a flat area where the elevation of the land is within a predetermined range.

According to the embodiment, the unloading condition may vary depending on the delivery product.

According to the embodiment, the sensing information may be a captured image of the delivery area, and the delivery area may be reestablished to the second area from the first area when an object, which makes delivery impossible, is explored from the image.

According to the embodiment, the control method may include: controlling the aircraft so that the aircraft hovers at one point while reestablishing the delivery area.

According to the embodiment, the control method may further include: receiving terminal position information of a recipient who is scheduled to receive the delivery product, in which the delivery area varies depending on the terminal position information.

According to the embodiment, the control method may include: establishing, based on the delivery location, a first area facing a first door, and a second area facing a second door; and establishing the first area or the second area to the delivery area on the basis of the terminal position information.

According to the embodiment, the control method may include: establishing, on the basis of the address, a waypoint spaced apart from the delivery area at a reference distance, the waypoint being included in the flight lane; receiving an image of the delivery area captured at the waypoint by the aircraft; and exploring the delivery area by using the image.

According to the embodiment, in the establishing of the waypoint, the reference distance may vary depending on the number of floors at the delivery location included in the address.

According to the embodiment, in the establishing of the waypoint, the reference distance may vary depending on characteristics of a camera mounted in the aircraft and configured to capture the image.

According to the embodiment, in the establishing of the waypoint, the waypoint may be represented by three-dimensional coordinates defined by latitude, longitude, and altitude, and an altitude value of the waypoint may vary depending on the number of floors at the delivery location included in the address.

According to the embodiment, the establishing of the waypoint may include: acquiring height information of a building including the delivery location; and determining the altitude value by comparing the number of floors at the delivery location included in the address with the height information.

According to the embodiment, the exploring of the delivery area by using the image may include: overlaying the image with a matrix including quadrangles with predetermined sizes; and starting counting from a reference quadrangle and exploring a delivery area corresponding to any one quadrangle from the image overlaid with the matrix.

According to the embodiment, the predetermined size may vary depending on the address.

Further, the present invention provides a control apparatus for an aircraft, which performs the control method according to the embodiment, and an aircraft configured to be controlled by the control method.

The effects of the control apparatus for an aircraft and the control method therefor according to the present invention will be described below.

The control apparatus for an aircraft according to the present invention may more quickly and accurately explore the delivery location and minimize consumption of energy required for the delivery.

DETAILED DESCRIPTION OF THE DISCLOSURE

Figure 1:
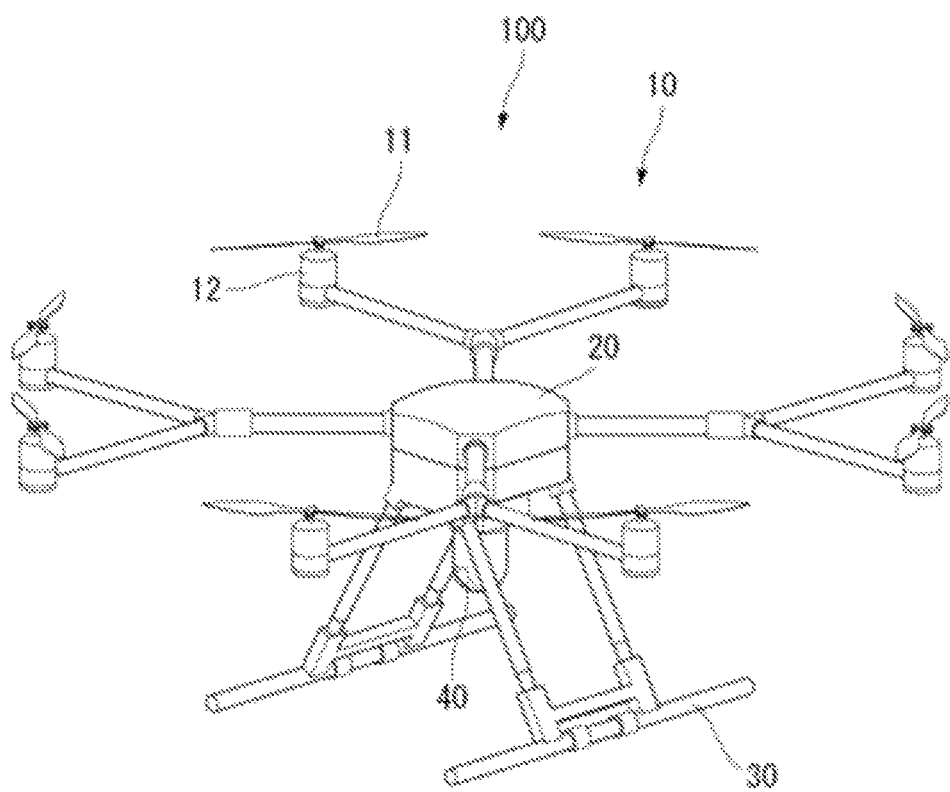
FIG. 1 is a perspective view illustrating one aspect of an aircraft according to the present invention.

Hereinafter, embodiments disclosed in the present specification will be described in detail with reference to the accompanying drawings. The same or similar constituent elements are assigned with the same reference numerals regardless of reference numerals, and the repetitive description thereof will be omitted. The suffixes "module", "unit", "part", and "portion" used to describe constituent elements in the following description are used together or interchangeably in order to facilitate the description, but the suffixes themselves do not have distinguishable meanings or functions. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present application, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 2:
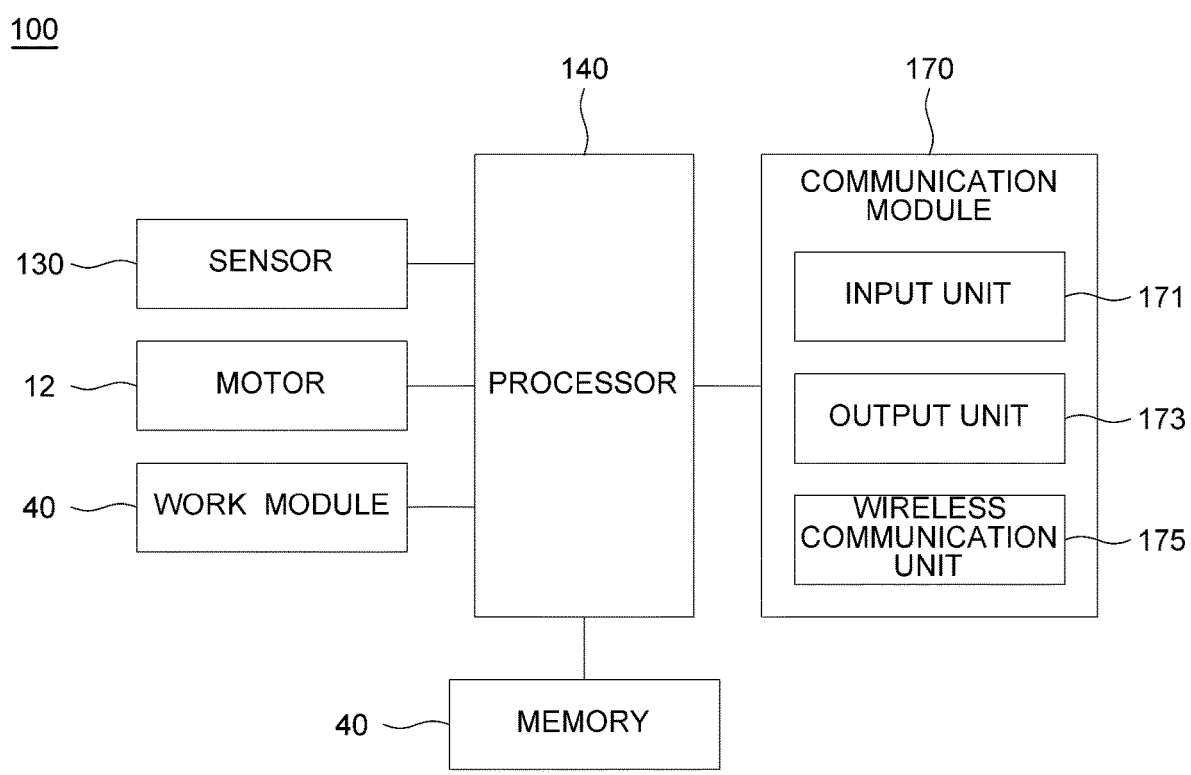
FIG. 2 is a block diagram for explaining the aircraft according to the present invention.

An aircraft will be described more specifically with reference to FIGS. 1 and 2. FIG. 1 is a perspective view illustrating one aspect of an aircraft according to the present invention, and FIG. 2 is a block diagram for explaining the aircraft according to the present invention.

The aircraft disclosed in the present specification include an internal combustion engine aircraft having an engine as a power source, a hybrid aircraft having an engine and an electric motor as power sources, an electric aircraft having an electric motor as a power source, and a hydrogen fuel cell aircraft using hydrogen energy.

Further, the aircraft includes an unmanned aerial vehicle (UAV). An unmanned aircraft refers to an object that autonomously flies without a pilot and/or under the guidance of radio waves received from a remote controller. Recently, in addition to military applications such as reconnaissance and attack, the unmanned aircraft have been increasingly used for commercial applications such as observation and delivery, and civilian applications such as imaging.

An aircraft 100 flies in an unmanned manner, either manually operated by a manager on the ground or automatically piloted by a preset flight program. As illustrated in FIG. 1, the aircraft 100 includes at least one of a main body 20, power supply units 10, and landing legs 130.

The main body 20 is a body portion on which a work module 40 is mounted. The work module 40 is a hardware module capable of being attached to or detached from the main body 20 in accordance with the function required for the aircraft 100. For example, a robot arm for grasping or releasing objects, a gimbal for minimizing shaking, an image sensor for generating images, and the like may be attached to or detached from the main body 20.

The power supply units 10 are configured as one or more propellers 11 vertically installed on the main body 20. The power supply units 10 according to the embodiment of the present invention may include a plurality of propellers 11 disposed to be spaced apart from one another, and motors 12. In this case, the power supply unit 10 may be configured as an air injection type thrusting structure instead of the propeller 11.

A plurality of propeller support parts is radially provided on the main body 20. The motor 12 may be mounted on each of the propeller support parts. The propeller 11 is mounted on the motor 12.

The plurality of propellers 11 may be symmetrically disposed with respect to the main body 20. Further, a rotation direction of the motor 12 may be determined so that rotation directions of the plurality of propellers 11 are a combination of clockwise and counterclockwise directions. The rotation directions of the pair of propellers 11, which is disposed symmetrically with respect to the main body 20, may be configured to be equal to each other (e.g., the clockwise direction). Further, alternatively, the rotation directions of another pair of propellers 11 may be opposite to each other (e.g., the counterclockwise direction).

The landing legs 30 may be disposed on a bottom surface of the main body 20 and spaced apart from one another. In addition, a shock-absorbing support member (not illustrated) may be mounted on a lower portion of the landing leg 30 to minimize impact caused by a collision with the ground surface when the aircraft 100 lands. Of course, the aircraft 100 may have various structures of the configuration of the aircraft that are different from those described above.

With reference to FIG. 2, the aircraft 100 measures flight states thereof by using various types of sensors to fly stably. The aircraft 100 may include a sensor 130 including at least one sensor.

The flight states of the aircraft 100 are defined as rotational states and translational states.

The rotational states mean yaw, pitch, and roll, and the translational states mean the longitude, the latitude, the altitude, and the velocity.

In this case, the roll, pitch, and yaw are called Euler angles and represent the angle by which the three axes x, y, and z of the aircraft body frame coordinates are rotated about some specific coordinates, e.g., the three axes N, E, and D of the NED coordinates. In case that the front side of the aircraft rotates leftward or rightward about the z-axis of the body frame coordinates, the x-axis of the body frame coordinates has an angular difference with respect to the N-axis of the NED coordinates, and this angle is called "yaw" ($\Psi$). In case that the front side of the aircraft rotates upward or downward about the y-axis toward the right side, the z-axis of the body frame coordinates has an angular difference with respect to the D-axis of the NED coordinates, and this angle is called "pitch" ($\theta$). In case that the fuselage of the aircraft is tilted to leftward or rightward about the x-axis toward the front side, the y-axis of the body frame coordinates has an angle with respect to the E-axis of the NED coordinates, and this angle is called a "roll" ($\Phi$).

The aircraft 100 uses three-axis gyro sensors (gyroscopes), three-axis acceleration sensors (accelerometers), and three-axis geomagnetic sensors (magnetometers) to measure rotational states. The aircraft 100 uses GPS sensors and barometric pressure sensors to measure translational states.

The sensors 130 of the present invention include at least one of a gyro sensor, an acceleration sensor, a GPS sensor, an image sensor, and a barometric pressure sensor. In this case, the gyro sensor and the acceleration sensor measure states in which a body frame coordinate of the aircraft 100 is rotated and accelerated relative to an earth-centered inertial coordinate. The gyro sensor and the acceleration sensor may each be manufactured as a single chip called an inertial measurement unit (IMU) by using a micro-electromechanical system (MEMS) semiconductor process technology.

The IMU chip may also include a microcontroller that converts the measurement values in earth-centered inertial coordinates measured by the gyro sensor and the acceleration sensor into local coordinates, such as the North-East-Down (NED) coordinates used for the GPS.

The gyro sensor measures the angular velocity at which the three axes x, y, and z of the body frame coordinates of the aircraft 100 rotate relative to the earth-centered inertial coordinates, calculates the values (Wx.gyro, Wy.gyro, Wz.gyro) converted into fixed coordinates, and converts these values to Euler angles ($\Phi$gyro, $\theta$gyro, $\Psi$gyro) by using linear differential equations.

The acceleration sensor measures the acceleration of the aircraft 100 with respect to the earth-centered inertial coordinates of the three axes x, y, and z of the body frame coordinates, calculates the values (fx,acc, fy,acc, and fz,acc) converted to fixed coordinates, and converts these values into roll ($\Phi$acc) and pitch ($\theta$acc). These values are used to remove the bias error contained in the roll ($\Phi$gyro) and pitch ($\theta$gyro) calculated using the measurement values of the gyro sensor.

The geomagnetic sensor measures the orientation of the aircraft 100 with respect to the magnetic north points of the three axes x, y, and z of the body frame coordinates, and uses these values to calculate a yaw value for the NED coordinate of the body frame coordinates.

The GPS sensor uses signals received from GPS satellites to calculate the translational state of the aircraft 100 in the NED coordinates, i.e., calculate the latitude (Pn.GPS), the longitude (Pe.GPS), the altitude (hMSL.GPS), the velocity in latitude (Vn.GPS), the velocity in longitude (Ve.GPS), and the velocity in altitude (Vd.GPS). In this case, the subscript MSL stands for a mean sea level (MSL).

The barometric pressure sensor may measure the altitude (hALP.baro) of the aircraft 100. In this case, the subscript ALP stands for air-level pressure. The barometric sensor compares the barometric pressure at takeoff of the aircraft 100 with the barometric pressure at the current flight altitude to calculate the current altitude from the takeoff point.

A camera sensor may include an image sensor (e.g., a CMOS image sensor) including at least one optical lens, a plurality of photodiodes (e.g., pixels) on which images are formed by light passing through the optical lens, and a digital signal processor (DSP) that constructs an image on the basis of signals outputted from the photodiodes. The digital signal processor may generate still images as well as movies including frames including still images.

The aircraft 100 includes a communication module 170 that receives information and outputs or transmits information. The communication module 170 refers to a device for implementing communication between the aircraft 100 and the user. The communication module 170 may receive a user input and provide information produced in the aircraft 100 to the user. The aircraft 100 may implement a user interface (UI) or a user experience (UX) by means of the communication module 170.

The communication module 170 may include an input unit 171 and an output unit 173. Further, the communication module 170 may include a wireless communication unit 175 configured to transmit information to or receive information from other external devices.

The input unit 171 serves to receive information from the user. The data collected by the input unit 171 may be analyzed by a processor 140 and processed as the user's control instruction.

The input unit 171 may include a voice input unit, a gesture input unit, a touch input unit, a mechanical input unit, and a camera.

The voice input unit may convert the user's voice input into an electrical signal. The converted electrical signal may be provided to the processor 140. The voice input unit may include one or more microphones.

The gesture input unit may convert the user's gesture input into an electrical signal. The converted electrical signal may be provided to the processor 140.

The gesture input unit may include at least any one of an infrared sensor and an image sensor that serve to detect the user's gesture input.

According to the embodiment, the gesture input unit may detect a three-dimensional gesture input of the user. To this end, the gesture input unit may include a light output unit or a plurality of image sensors that outputs a plurality of infrared rays.

The gesture input unit may detect the three-dimensional gesture input of the user in a time-of-flight (TOF) manner, a structured light manner, or a disparity manner.

The touch input unit may convert the user's touch input into an electrical signal. The converted electrical signal may be provided to the processor 140. The touch input unit may include a touch sensor for sensing the user's touch input.

According to the embodiment, the touch input unit may be integrated with a display unit to implement a touch screen. The touch screen may also provide an input interface and an output interface between the aircraft 100 and the user.

The mechanical input unit may include at least any one of a button, a dome switch, a jog wheel, and a jog switch. An electrical signal generated by the mechanical input unit may be provided to the processor 140.

The camera may acquire a user image. The processor 140 may detect the user's state on the basis of the user image. The processor 140 may acquire information on the user's line of sight from the user image. The processor 140 may detect the user's gesture from the user image.

A living body sensing unit may acquire the user's bio-information. The living body sensing unit may include a sensor capable of acquiring the user's bio-information, and the sensor may be used to acquire the user's fingerprint information, the user's heart rate information, and the like. The bio-information may be used for user authentication.

The output unit 173 serves to generate outputs related to visual, auditory, or tactile sensations. The output unit 173 may include at least any one of the display unit, a sound output unit, and a haptic output unit.

The display unit may display a graphic object corresponding to various types of information. The display unit may include at least one of a liquid crystal display (LCD), a thin-film transistor liquid crystal display (TFT LCD), an organic light-emitting diode (OLED), a flexible display, a three-dimensional display (3D display), and an e-ink display.

The display unit may be configured to form a layer structure or be integrated with the touch input unit, thereby implementing the touch screen.

The sound output unit converts an electrical signal, which is provided from the processor 140, into an audio signal and outputs the audio signal. To this end, the sound output unit may include one or more speakers.

The haptic output unit generates a tactile output. For example, the haptic output unit may operate to vibrate an actuator to enable the user to recognize an output.

The input unit 171 and/or the output unit 173 may be provided in a terminal 300 instead of being provided in the aircraft 100.

For example, the aircraft 100 may receive information through the input unit 171 or receive information, which is inputted to the separate terminal 300 or a server 200, through the wireless communication unit 175.

For example, the aircraft 100 may output information directly to the output unit 173. As another example, the aircraft 100 may transmit information to the separate terminal 300 through the wireless communication unit 175, such that the terminal 300 may output information.

The wireless communication unit 175 refers to a device that communicates with an external device. The wireless communication unit 175 may be configured to communicate with the server 200, the terminal 300, and the like. The wireless communication unit 175 may receive information inputted from the terminal 300 such as a smartphone or a computer. The wireless communication unit 175 may transmit information to be outputted to the terminal 300. The terminal 300 may output information received from the wireless communication unit 175.

The wireless communication unit 175 may include at least any one of a transmitting antenna, a receiving antenna, and a radio frequency (RF) circuit and an RF element for implementing various types of communication protocols in order to perform communication.

The wireless communication unit 175 may receive various types of instruction signals from the terminal 300 and/or the server 200. The wireless communication unit 175 may receive zone information for traveling, a traveling lane, and a traveling instruction from the terminal 300 and/or the server 200. In this case, the zone information may include a flight restriction zone A information and an approach restriction distance information.

The wireless communication unit 175 may include a near-field communication unit, a position information unit, a V2X communication unit, and a communication unit 440.

According to the embodiment, the wireless communication unit 175 may further include other constituent elements in addition to the above-mentioned constituent elements or may not include some of the above-mentioned constituent elements.

The near-field communication unit refers to a unit for implementing short-range communication. The near-field communication unit may support the short-range communication by using at least one of Bluetooth™, radio frequency identification (RFID), infrared data association (IrDA), ultra-wideband (UWB), ZigBee, near-field communication (NFC), wireless-fidelity (Wi-Fi), Wi-Fi Direct, and wireless universal serial bus (Wireless USB) technologies.

The near-field communication unit may form a short-range wireless area network to perform the near-field communication between the aircraft 100 and the at least one external device.

The position information unit refers to a unit for acquiring position information of the aircraft 100. For example, the position information unit may include a global positioning system (GPS) module or a differential global positioning system (DGPS) module.

The V2X communication unit refers to a unit for performing wireless communication with the server (V2I: Vehicle to Infra), other aircraft (V2V: Vehicle to Vehicle), or pedestrians (V2P: Vehicle to Pedestrian). The V2X communication unit may include RF circuits capable of implementing protocols for communication (V2I) with infrastructures, communication (V2V) between aircraft, and communication (V2P) with pedestrians.

The optical communication unit refers to a unit for performing communication with the external device by means of light. The optical communication unit may include a light-transmitting unit configured to convert an electrical signal into an optical signal and transmit the optical signal to the outside, and a light-receiving unit configured to convert the received optical signal into an electrical signal.

The aircraft 100 includes the processor 140 configured to process and determine various types of information while recognizing the mapping and/or the current position. The processor 140 may control the overall operation of the aircraft 100 by controlling various types of components that constitute the aircraft 100.

The processor 140 may receive information from the communication module 170 and process the information. The processor 140 may receive information from the input unit 171 and process the information. The processor 140 may receive information from the wireless communication unit 175 and process the information.

The processor 140 may receive the detection information from the sensor 130 and process the information. The processor 140 may control an operation of the motor 12. The processor 140 may control an operation of the work module 40.

The aircraft 100 may include a memory 150 configured to store various types of data. The memory 150 may serve to record various types of information required to control the aircraft 100 and include a volatile or non-volatile recording medium.

The memory 150 may store a map related to a traveling zone. The map may be inputted by the external terminal 300 that may exchange information with the aircraft 100 by means of the wireless communication unit 175, or the map may be autonomously learned and generated by the aircraft 100. In the former case, examples of the external terminal 300 may include a remote control, PDA, laptop, smartphone, tablet, etc. equipped with an application for establishing the map.

Figure 3:
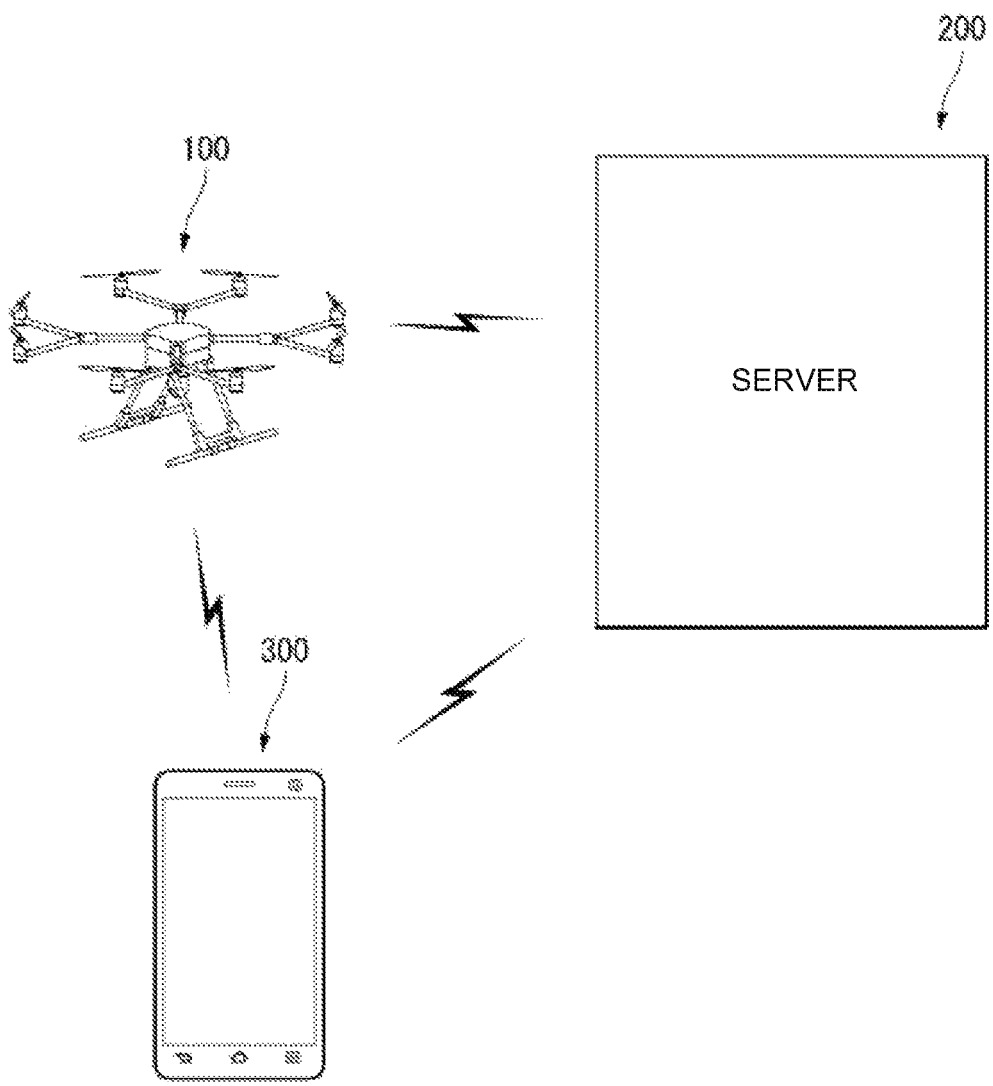
FIG. 3 is a block diagram illustrating control relationships between main components of an aviation control system according to an embodiment of the present invention.

FIG. 3 is a block diagram illustrating control relationships between main components of an aviation control system according to an embodiment of the present invention.

With reference to FIG. 3, the aviation control system according to the embodiment of the present invention may include the aircraft 100 and the server 200 or include the aircraft 100, the terminal 300, and the server 200. The aircraft 100, the terminal 300, and the server 200 are connected to one another by a wireless communication method.

A global system for mobile communication (GSM), code division multi-access (CDMA), code division multi-access 2000 (CDMA2000), enhanced voice-data optimized or enhanced voice-data only (EV-DO), wideband CDMA (WCDMA), high-speed downlink packet access (HSDPA), high-speed uplink packet access (HSUPA), long-term evolution (LTE), long-term evolution-advanced (LTE-A), and the like may be used as the wireless communication method.

A wireless Internet technology may be used for the wireless communication method. Examples of the wireless Internet technology include wireless LAN (WLAN), wireless-fidelity (Wi-Fi), wireless fidelity (Wi-Fi) Direct, digital living network alliance (DLNA), wireless broadband (Wi-Bro), world interoperability for microwave access (WiMAX), high-speed downlink packet access (HSDPA), high-speed uplink packet access (HSUPA), long-term evolution (LTE), long-term evolution-advanced (LTE-A), 5G, and the like. In particular, faster response is possible by transmitting and receiving data using 5G communication networks.

In the present specification, a base station is meant as a terminal node of a network that communicates directly with a terminal. In the present specification, a particular operation described as being performed by the base station may be performed by an upper node of the base station, in some instances. That is, it is apparent that in a network including a plurality of network nodes including a base station, various operations performed for communication with a terminal may be performed by the base station or by other network nodes other than the base station. The term 'base station (BS)' may be replaced with the terms including fixed station, Node B, evolved-NodeB (eNB), base transceiver system (BTS), access point (AP), next generation NodeB (gNB), and the like. In addition, the 'terminal' may be fixed or have mobility. The term 'terminal' may be replaced with terms including user equipment (UE), mobile station (MS), user terminal (UT), mobile subscriber station (MSS), subscriber station (SS), advanced mobile station (AMS), wireless terminal (WT), machine-type communication (MTC) device, machine-to-machine (M2M) device, device-to-device (D2D) device, and the like.

In the following description, a downlink (DL) refers to the communication from the base station to the terminal, and an uplink (UL) refers to the communication from the terminal to the base station. In the downlink, the transmitter may be a part of the base station, and the receiver may be a part of the terminal. In the uplink, the transmitter may be a part of the terminal, and the receiver may be a part of the base station.

Hereinafter, a control apparatus 300 for an aircraft, which controls the aircraft 100, will be described specifically.

The control apparatus 300 for an aircraft may be provided in the aircraft 100. For example, the control apparatus 300 may be configured as an independent device capable of being attached to or detached from the aircraft 100. Alternatively, the control apparatus 300 may be integrated with the aircraft 100 and thus configured as a partial constituent element of the aircraft 100.

The control apparatus 300 for an aircraft may be a device physically separated from the aircraft 100 and control the aircraft 100 through wireless communication, like the server 200 or the terminal 300.

Hereinafter, for convenience of description, the control apparatus for the aircraft 100 will be described as being a separate component provided independently of the processor 140 of the aircraft 100. However, this is merely the embodiment of the present invention. All the operations and control methods for the control apparatus 300 for an aircraft, which will be described in the present specification, may be performed by the processor 140 of the aircraft 100. That is, the operation and/or control method for the control apparatus, which are operated by a processor 430 of the aircraft 100, may be performed by the processor 140 of the aircraft 100.

Figure 4:
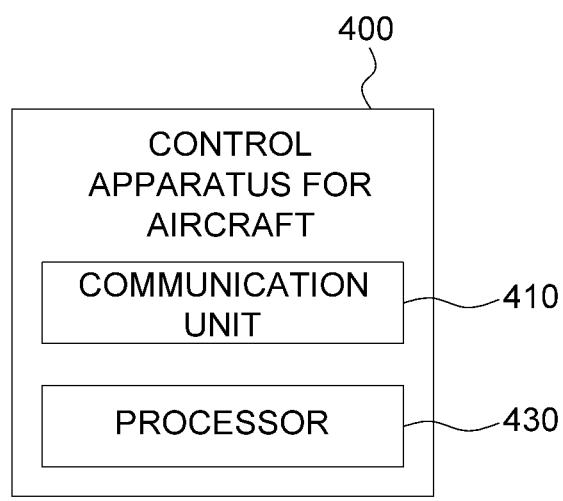
FIG. 4 is a conceptual view for explaining a control apparatus for an aircraft according to the embodiment of the present invention.

FIG. 4 is a conceptual view for explaining the control apparatus for an aircraft according to the embodiment of the present invention.

With reference to FIG. 4, the control apparatus 400 for an aircraft includes a communication unit 410 and the processor 430.

The communication unit 410 is configured to communicate with various constituent elements described with reference to FIG. 2. For example, the communication unit 410 may receive various types of information provided through a controller area network (CAN). As another example, the communication unit 410 may communicate with all the devices capable of performing communication, such as aircraft, mobile terminals, servers, and other aircraft. This may be referred to as vehicle-to-everything (V2X) communication. The V2X communication may be defined as a technology that exchanges or shares information such as traffic situations while communicating with flight infrastructures and other aircraft during the flight.

The communication unit 410 may receive information related to the flight of the aircraft from most of the devices provided in the aircraft 100. The information, which is transmitted from the aircraft 100 to the control apparatus 400 for an aircraft, will be referred to as 'flight information'.

The flight information includes aircraft information and surrounding information of the aircraft. Based on the frame of the aircraft 100, the information related to the inside of the aircraft may be defined as the aircraft information, and the information related to the outside of the aircraft may be defined as the surrounding information.

The aircraft information means information related to the aircraft itself. For example, the aircraft information may include a traveling speed, a traveling direction, an acceleration, an angular velocity, a position (GPS), and a weight of the aircraft, the number of occupants in the aircraft, a braking force of the aircraft, a maximum braking force of the aircraft, a centrifugal force applied to the aircraft, a traveling mode of the aircraft (whether the mode is an autonomous traveling mode or a manual traveling mode), a parking mode of the aircraft (an autonomous parking mode, an automatic parking mode, and a manual parking mode), whether a user is seated in the aircraft, information related to the user, and the like.

The surrounding information means information related to the outside of the aircraft and information on other objects positioned within a predetermined range around the aircraft. For example, the surrounding information may include an atmospheric state and a weather of the sky in which the aircraft is flying, a distance from a forward (or rearward) aircraft, a relative velocity of the forward (or rearward) aircraft, brightness at the periphery of the aircraft, information related to an object present in a reference area (predetermined area) around the aircraft, whether an object enters/exits the predetermined area, whether the user is present at the periphery of the aircraft, and information related to the user (e.g., whether the user is an authenticated user), and the like.

In addition, the surrounding information may include ambient brightness, ambient temperature, sun position, information on an object positioned at the periphery (people, other aircraft, signs, etc.), terrain features, and information on a flight lane along which the aircraft travels.

In addition, the surrounding information may further include a distance between the aircraft 100 and an object present at the periphery of the aircraft, a likelihood of collision, the type of object, a parking space in which the aircraft may be parked, an object (e.g., parking lines, ropes, other aircraft, walls, etc.) for identifying the parking space.

The flight information is not limited to the above-mentioned examples and may include all types of information produced by the constituent elements provided in the aircraft 100.

Meanwhile, the processor 430 is configured to control one or more displays provided in the aircraft 100 by using the communication unit 410.

Specifically, the processor 430 may determine whether at least one of a plurality of preset conditions is satisfied on the basis of the flight information received through the communication unit 410. The processor 430 material one or more devices provided in the aircraft in different ways depending on the satisfied condition.

Regarding the preset conditions, the processor 430 may detect the occurrence of the event in the electrical component and/or application provided in the aircraft 100 and determine whether the detected event satisfies the preset condition. In this case, the processor 430 may detect the occurrence of the event from the information received through the communication unit 410.

The application has a concept including a widget or a home launcher and means all types of programs that may be executed in the aircraft 100. Therefore, the application may be a program that serves to control the motor, control task equipment, and update the application.

Further, the application may include at least one of forward collision warning (FCW), blind spot detection (BSD), lane departure warning (LDW), pedestrian detection (PD), and turn-by-turn navigation (TBT).

For example, the occurrence of the event may refer to a case in which the warning established by an advanced driver assistance system (ADAS) is issued, and the function established by the ADAS is performed. For example, it may be determined that the event occurs when the forward collision warning is issued, the blind spot detection occurs, the lane departure warning is issued, autonomous emergency braking is performed, or an emergency landing function is performed.

As another example, it may be determined that the event occurs even when a gear position is changed from a forward gear to a rear gear, an acceleration higher than a predetermined value occurs, a deceleration lower than a predetermined value occurs, a power device is changed from an internal combustion engine to a motor, or a power device is changed from the motor to the internal combustion engine.

In addition, it may be determined that the event occurs even when various ECUs provided in the aircraft 100 perform particular functions.

In case that the occurring event satisfies the preset condition, the processor 430 controls the communication unit 410 so that information corresponding to the satisfied condition is displayed on the one or more displays. The display may be provided in at least one of the aircraft 100, the server 200, and the terminal 300.

Hereinafter, an operation of the control apparatus 400 for an aircraft will be described more specifically with reference to the accompanying drawings.

Figure 5:
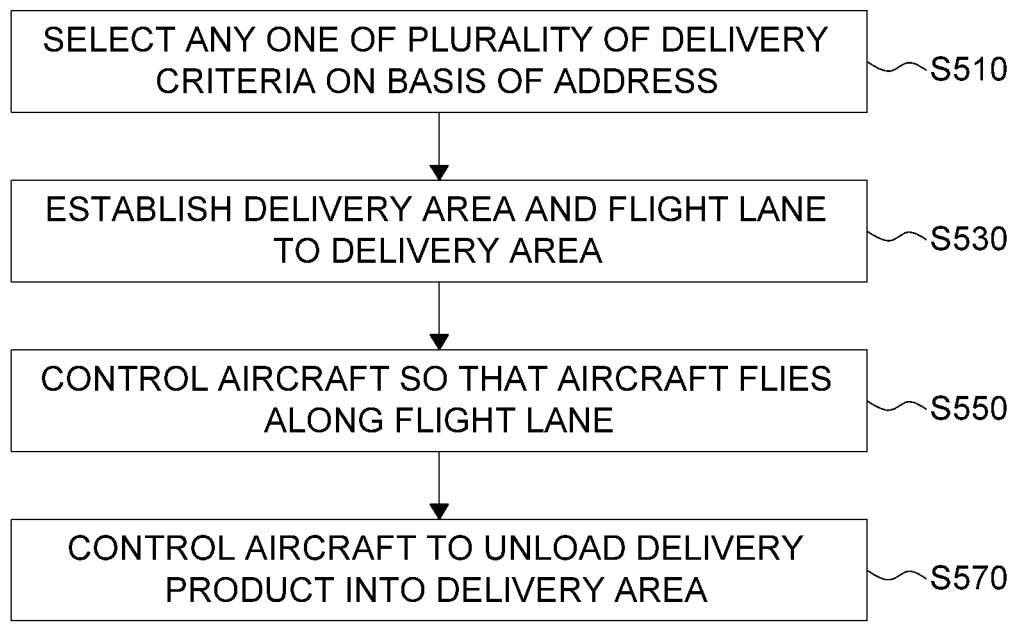
FIG. 5 is a flowchart for explaining a control method for the control apparatus for an aircraft in FIG. 4.

FIG. 5 is a flowchart for explaining a control method for the control apparatus for an aircraft in FIG. 4.

The processor 430 receives an address of a delivery location to which a delivery product is to be delivered. The processor 430 controls the aircraft by means of the communication unit to deliver the delivery product to the delivery location. For example, the processor 430 may start the aircraft 100 and control the motors to take off the aircraft 100 and move the aircraft 100 in the air to the delivery location. The processor 430 may transmit the control instruction, in a wired or wireless manner, to the aircraft and/or various types of devices provided in the aircraft.

At least one of the properties of the delivery product and the address of the delivery location may be received from the server 200 and/or the terminal 300 described above with reference to FIG. 3.

With reference to FIG. 5, the processor 430 may select, on the basis of the address, any one of a plurality of delivery criteria that defines an area in which the aircraft 100 is to unload the delivery product (S510).

The delivery criterion defines the area in which the delivery product is to be unloaded. The delivery area into which the delivery product is to be delivered may vary depending on the delivery criterion. More specifically, even in case that the delivery products are delivered to the same address, the delivery area into which the delivery product is to be delivered may vary depending on the delivery criterion.

For example, a first delivery criterion may be defined as a vacant lot located within a predetermined distance from an entrance of the address, a second delivery criterion may be defined as a stationary item storage box provided on a veranda or rooftop of the address, and a third delivery criterion may be defined as a movable item storage box that moves on the ground in an unmanned manner.

As another example, the plurality of delivery criteria may include a delivery criterion for a cottage that is specialized for the cottage, a delivery criterion for a staircase apartment that is specialized for the staircase apartment, a delivery criterion for a hallway apartment that is specialized for the hallway apartment, and a delivery criterion for shared households connected to a plurality of addresses and co-managed.

The delivery criteria may be stored in the server 200 or the memory provided in the control apparatus 400 for an aircraft. The delivery criterion may be regularly or irregularly updated. The existing delivery criterion may be modified and/or eliminated, or a new delivery criterion may be added.

Different delivery criteria may be selected in response to the user's request instead of the address. For example, in case that the user designates a rooftop as the delivery area, the delivery criterion, which defines the rooftop as the delivery area regardless of the address.

The processor 430 may establish the delivery area and the flight lane to the delivery area on the basis of the delivery criterion (S530).

The delivery areas are explored and established in different ways depending on the delivery criteria, and the flight lane from the current position (=delivery start position) of the aircraft 100 to the delivery area is established.

The processor 430 acquires maps including addresses, satellite images, and the like as delivery location information and establishes the delivery area by applying the selected delivery criterion to the delivery location information. The delivery areas are differently established depending on the delivery criteria. For example, in case that the delivery criterion, which defines the rooftop, is selected, the processor 430 may explore an area corresponding to the rooftop from the map and establish the explored area to the delivery area.

The processor 430 may control the aircraft so that the aircraft flies along the flight lane (S550).

The flight lane is configured as a sequence of three-dimensional coordinate values represented by latitude, longitude, and altitude, and the aircraft 100 flies along the flight lane. The flight lane may include information on velocities of the aircraft 100 for each of the coordinate values. For example, the flight lane may be established so that the aircraft reaches, at a first velocity, to a point corresponding to a first coordinate value and reaches, at a second velocity, to a point corresponding to a second coordinate value.

The processor 430 may control the aircraft to unload the delivery product into the delivery area in case that the aircraft reaches the delivery area (S570).

The aircraft 100 may unload or release or drop the delivery product into the delivery area in various ways.

In the case of manned delivery, the person, who performs the delivery, arrives at the delivery location, determines the optimum location by visually inspecting the characteristics of the delivery location, and delivers the delivery product. With the demand for non-face-to-face delivery due to the coronavirus pandemic, unmanned delivery is being introduced to the field. However, there is a problem in that it is not possible to perform deliveries in various delivery environments. The present invention has been made in an effort to solve the above-mentioned problems and provides a method of enabling the aircraft to deliver the delivery product to the optimum location.

Figure 6:
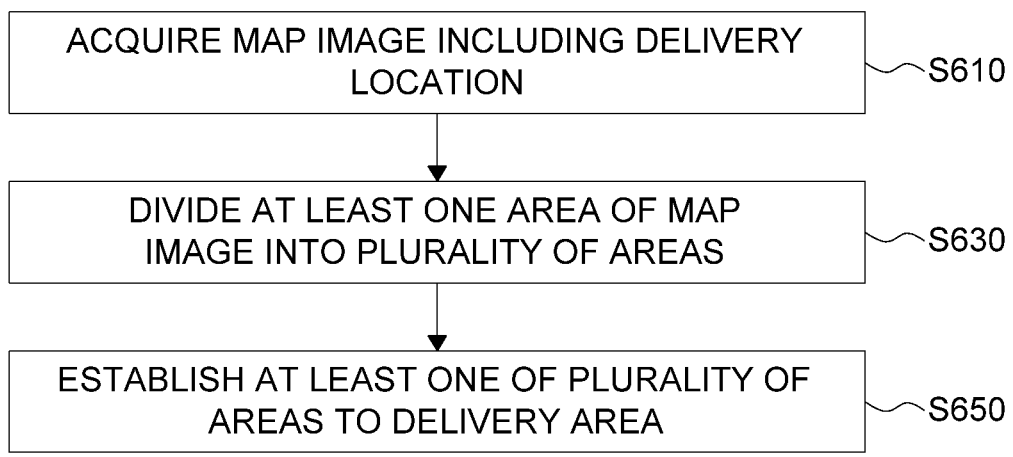
FIG. 6 is a flowchart for explaining a method of establishing a delivery area by using sensing information received from the aircraft.
Figure 7A:
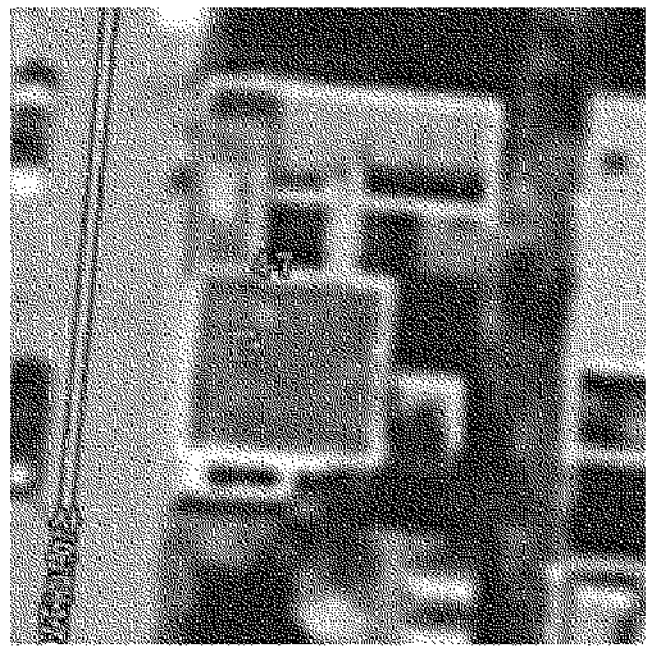
FIGS. 7A and 7B are conceptual views for explaining the control method in FIG. 6.
Figure 7B:
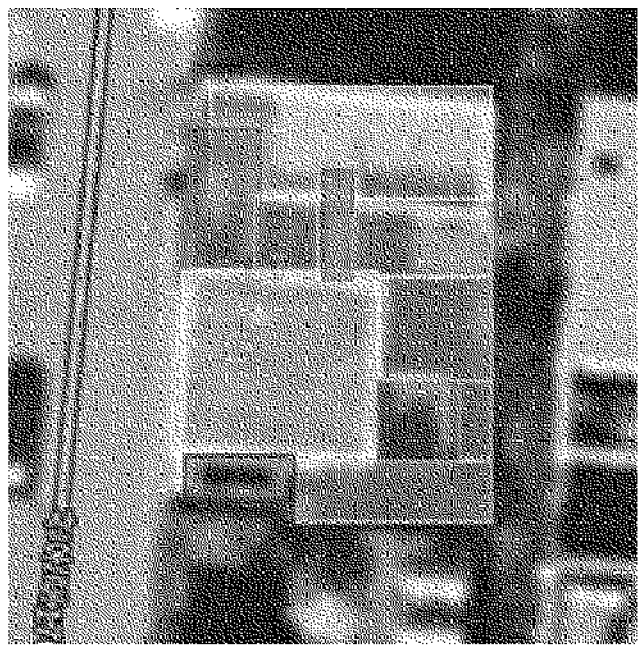

FIG. 6 is a flowchart for explaining a method of establishing a delivery area by using sensing information received from the aircraft, and FIGS. 7A and 7B are conceptual views for explaining the control method in FIG. 6.

The processor 430 may acquire a map image including the delivery location (S610).

The processor 430 may acquire at least one area including the delivery location in the map image from the server 200 and/or the memory provided in the control apparatus 400 for an aircraft in order to establish the delivery area.

For example, as illustrated in FIG. 7A, the map image may include a map, an aerial image, a satellite image, a cadastral compilation map, and the like.

The processor 430 may divide at least one area of the map image into a plurality of areas (S630).

More specifically, the processor 430 may analyze the image and divide a predetermined area, which is defined based on one point of the delivery location, into an undeliverable area in which the user cannot receive the delivery product, and a deliverable area in which the user can receive the delivery product.

Further, the processor 430 may divide the deliverable area into sub-areas in accordance with the characteristics of the space. For example, as illustrated in FIG. 7B, a rooftop area may be classified as a yellow area, a garden area may be classified as a green area, and a veranda area may be classified as a blue area. In this case, a red area is an undeliverable area in which the aircraft cannot unload the delivery product or an undeliverable area that the user cannot reach such that the user cannot obtain the unloaded delivery product.

The processor 430 may establish at least one of the plurality of areas to the delivery area on the basis of the delivery criterion (S650).

With reference to FIG. 7B, the yellow area may be established as the delivery area in case that the delivery criterion is defined as the rooftop. The blue area may be established as the delivery area in case that the delivery criterion is defined as the veranda. The plurality of delivery criteria may be selected. In this case, a larger delivery area may be established than the case in which a single delivery criterion is selected.

First, the processor 430 establishes the delivery area that the aircraft is to reach before establishing the flight lane. Even for the same address, the flight lane of the aircraft varies depending on the delivery area, such that fuel for the aircraft may be efficiently managed.

However, because the pre-acquired image is used, there is a problem in that it is impossible to reflect an onsite situation that changes in real time. To solve the problem, in case that the aircraft reaches the delivery area, the processor 430 may receive sensing information sensed by the aircraft and reestablishes a delivery area on the basis of the sensing information.

Figure 8:
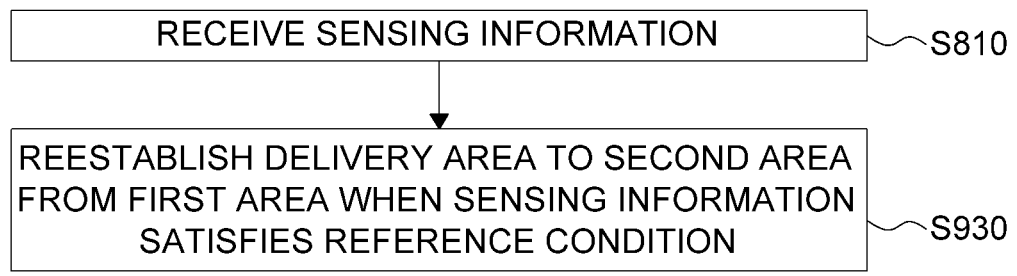
FIG. 8 is a flowchart for explaining a method of reestablishing a delivery area.

FIG. 8 is a flowchart for explaining a method of reestablishing a delivery area.

The processor 430 may receive the sensing information related to the delivery area and sensed by the sensor mounted in the aircraft (S810).

As described above with reference to FIG. 2, various sensors may be provided in the aircraft. For example, a camera, an ultrasonic sensor, a lidar, a radar, an infrared sensor such as a ToF, a barometric pressure sensor, and the like may be provided in the aircraft.

In case that the aircraft reaches the delivery area along the flight lane, the aircraft may activate the sensor, produce the sensing information related to the delivery area, and transmit the sensing information to the control apparatus 400 for an aircraft.

The processor 430 may compare the sensing information with the map image described with reference to FIG. 6 and exclude a portion, where there is a difference between the sensing information and the map image, from the delivery area. More specifically, on the basis of a result of comparing the sensing information and the map image, the processor 430 may divide the delivery area into a first delivery area in which the map image and the sensing information are coincident with each other, and a second delivery area in which the map image and the sensing information are not coincident with each other. In this case, the processor 430 may reestablish the first delivery area to the delivery area, and the second delivery area may be excluded from the reestablished delivery area.

In case that the sensing information satisfies the reference condition, the processor 430 may reestablish the delivery area to the second area from the first area (S830) and control the aircraft to unload the delivery product into the second area instead of the first area (S850).

In this case, the reference condition means a condition in which the delivery product cannot be delivered to the first area established to the delivery area. For example, a case, in which the vehicle is positioned in the first area or the delivery product cannot be unloaded into the first area because of deterioration in weather condition, may satisfy the reference condition.

The sensing information is a captured image of the delivery area. In case that an object, which makes the delivery impossible, is explored from the image, the processor 430 may reestablish the delivery area to the second area from the first area.

In case that the reference condition is satisfied, the delivery area is reestablished to a new area, and the aircraft moves to the new area and unloads the delivery product. The changed delivery area may be transmitted to the server 200 and/or the terminal 300 through the communication unit 410.

The processor 430 may control the aircraft so that the aircraft hovers at one point during the process of reestablishing the delivery area. More specifically, in case that the sensing information satisfies the reference condition while the aircraft flies along the flight lane, the processor may establish one point to a hovering point and control the aircraft so that the aircraft hovers at the hovering point.

The hovering point means a point at which neither object nor person is present within a predetermined range around the aircraft. The hovering point may vary depending on the number of motors provided in the aircraft. More specifically, a distance, which is a criterion of the predetermined range, may increase in accordance with the number of motors. This is to prevent noise generated by the aircraft from reaching the surrounding.

Figure 9:
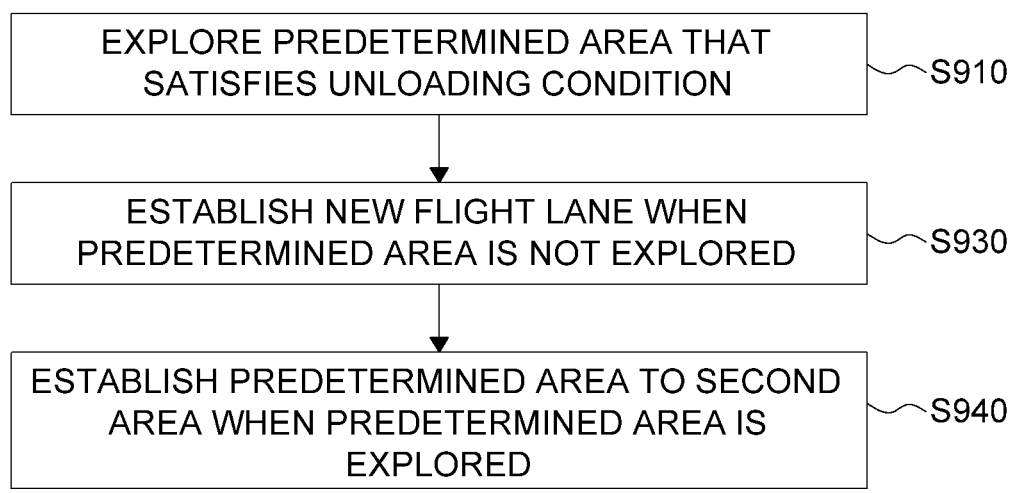
FIG. 9 is a flowchart for explaining a method of controlling the aircraft to reestablish a delivery area.

FIG. 9 is a flowchart for explaining a method of controlling the aircraft to reestablish a delivery area.

The processor 430 may use the sensing information and explore a predetermined area that satisfies a condition for unloading the delivery product (S910).

For example, the predetermined area may be a flat area where the elevation of the land is within a predetermined range. The processor 430 may explore the flat area by using a depth sensor, lidar, radar, or the like. This is to prevent the delivery product from rolling or sliding because of an inclination.

The unloading condition may vary depending on at least one of the characteristics of the aircraft, the deliverable mode, and the characteristics of the delivery product.

The characteristics of the aircraft include shapes of aircraft (fixed wing/rotary wing/helicopter type, etc.), sizes of aircraft, weights of aircraft, and the like.

The deliverable mode relates to a mode in which the aircraft may deliver the delivery product and includes an unloading mode in which the fixed delivery product is unloaded to the delivery location, a put-down mode in which the aircraft lands at the delivery location and unloads the delivery product on the ground, a wire mode in which a wire, which holds the delivery product, is used to unload the delivery product to the delivery location, and a conveyor mode in which a robot arm is used to transfer the delivery product to the delivery location.

The characteristics of the delivery product include types of delivery products, weights of delivery products, sizes of delivery products, shapes of delivery products, and the like.

The processor 430 establishes a new flight lane by using the sensing information in case that the predetermined area is not explored (S930) and control the aircraft so that the aircraft flies along the new flight lane (S950).

Because the respective sensors are mounted in the aircraft, a field of view (FoV) of the sensing information is defined based on the aircraft. For this reason, a blind spot, which is not explored at the current position of the aircraft, may be formed. To explore a new delivery area, the processor 430 determines a blind spot based on the current position and establishes a new flight lane for sensing the determined blind spot.

The processor 430 may explore a predetermined area in real time by using sensing information produced while the aircraft flies along the new flight lane.

In case that the predetermined area is explored while the aircraft flies along the new flight lane, the processor 430 may reestablish the predetermined area to the second area (S970).

Figure 10:
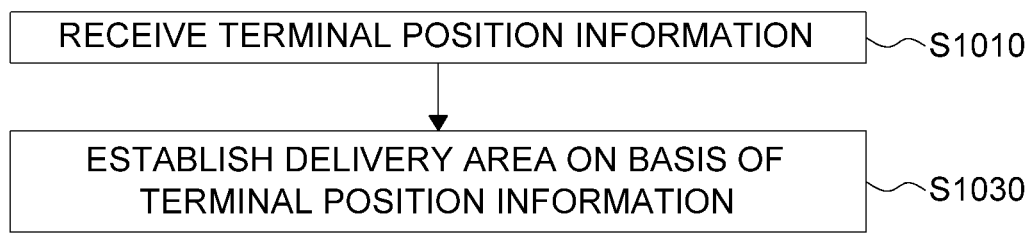
FIG. 10 is a flowchart for explaining a method of reestablishing a delivery area on the basis of a user who is to receive a delivery product.
Figure 11:
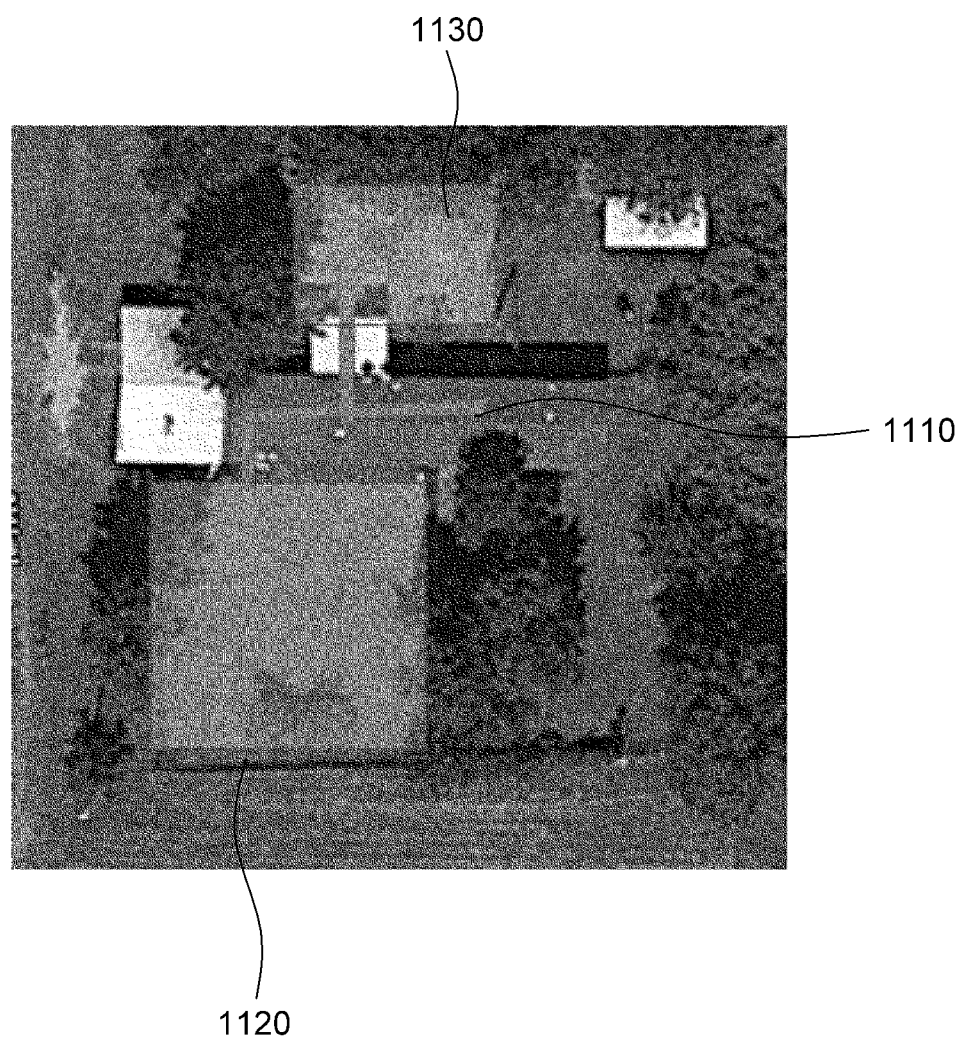
FIG. 11 is a conceptual view for explaining the method in FIG. 10.

FIG. 10 is a flowchart for explaining a method of reestablishing a delivery area on the basis of the user who is to receive the delivery product, and FIG. 11 is a conceptual view for explaining the method in FIG. 10.

The processor 430 may receive information on a position of a terminal of a recipient who is scheduled to receive the delivery product. For example, the terminal position information may be defined by latitude, longitude, and altitude (S1010).

The processor 430 may establish the delivery area on the basis of the terminal position information (S1030). More specifically, the delivery area may vary in real time depending on the terminal position information.

For example, as illustrated in FIG. 11, the processor 430 may establish a first area 1120 facing a first door based on the delivery location, and a second area 1130 facing a second door. The processor 430 may establish the first area or the second area to the delivery area on the basis of a terminal position 1110. In other words, an area in which the recipient may more quickly obtain the delivery product may be established to the delivery area.

Figure 12:
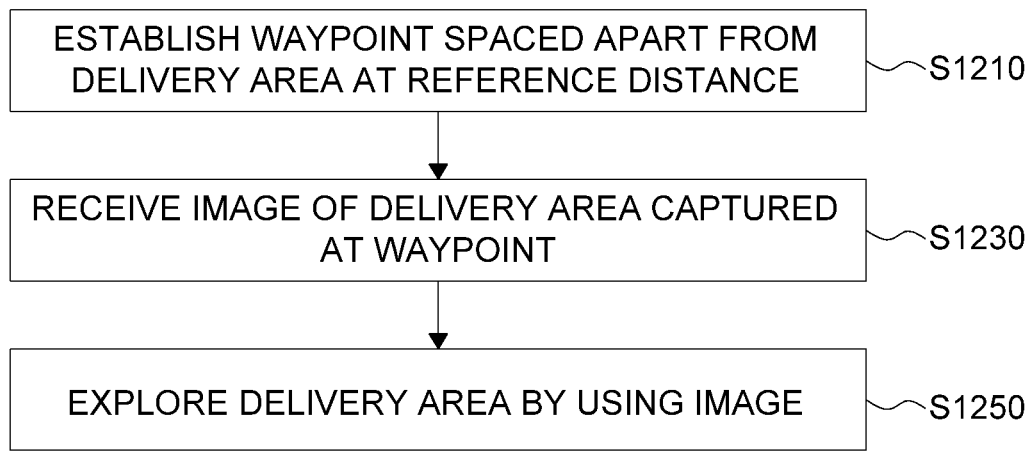
FIG. 12 is a flowchart for explaining a control method of exploring a delivery area.
Figure 13A:
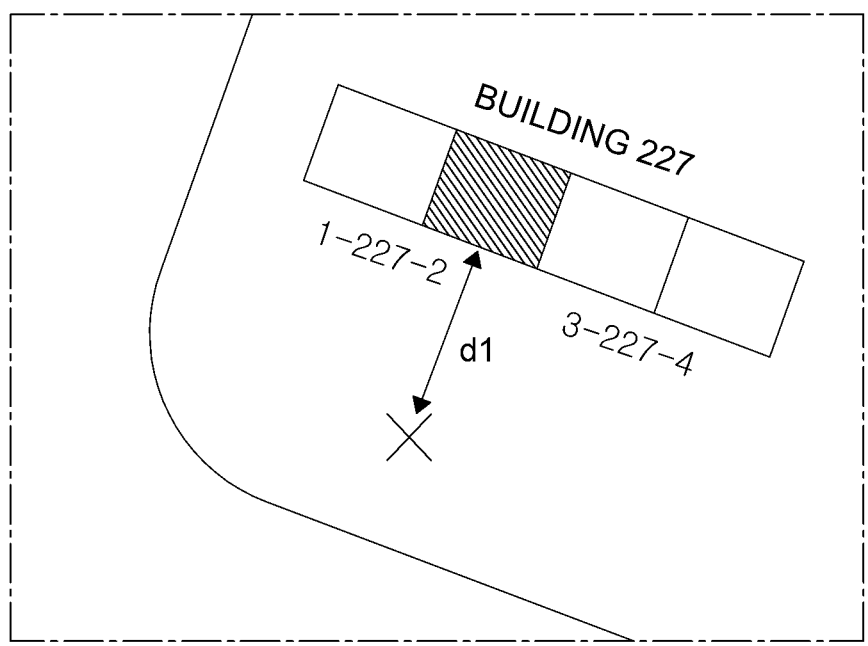
FIGS. 13A and 13B are exemplified views for explaining the control method in FIG. 12.
Figure 13B:
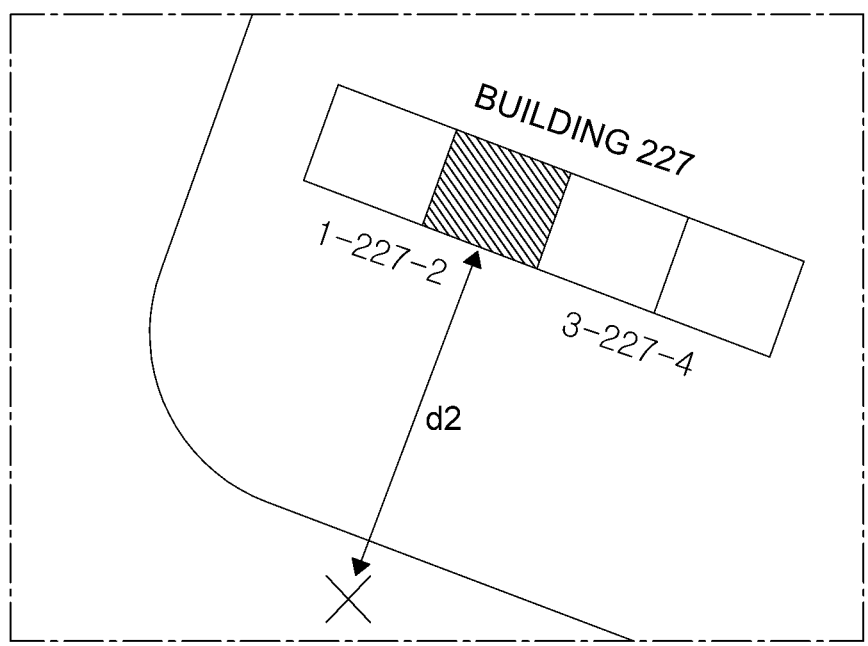

FIG. 12 is a flowchart for explaining a control method for exploring a delivery area, and FIGS. 13A and 13B exemplified views for explaining the control method in FIG. 12.

The processor 430 may establish, on the basis of the address, a waypoint spaced apart from the delivery area at a reference distance (S1210). The waypoint is included in the flight lane established by the processor 430.

In case that the aircraft delivers the delivery product to a particular house of an apartment including a plurality of houses, the problem is how to explore the house. The control apparatus for an aircraft according to the present invention establishes the waypoint to more quickly and accurately explore the delivery location.

In this case, the waypoint means a point at which the exploration of the delivery location is started by using the sensor provided in the aircraft.

The sensors may include various sensors such as a camera, radar, or lidar. For convenience of description, the camera will be described, for example.

As illustrated in FIG. 13A, apartment building 227 has four rows of houses on the same floor from first to fourth houses. In case that the apartment has a total of 30 floors, a total of 120 houses are disposed in the single building. In case that the delivery product is to be delivered to the item storage box provided on the veranda in the house with the address of No. 2 building 227, the problem is how to explore the address of No. 2 building 227 among the 120 houses.

The processor 430 of the control apparatus 400 for an aircraft according to the present invention establishes the waypoint on the basis of the address, and the waypoint is a start point for sensing the building with the address by using the sensor. In case that the aircraft reaches the waypoint, the sensor is activated and starts exploring the delivery area.

The waypoint may vary depending on the address even in the case of the same building.

The reference distance may vary depending on the number of floors at the delivery location included in the address. As illustrated in FIG. 13A, in the case of the first number of floors, the reference distance may be set to d1. As illustrated in FIG. 13B, in the case of the second number of floors, the reference distance may be set to d2.

For example, according to a result of comparing a first case in which the 27th floor is explored and a second case in which the 15th floor is explored in a 30-story building, the reference distance is shorter in the first case than the reference distance in the second case. The processor 430 may explore the veranda from the building image and explore the target floor by counting the number of floors from one end of the building downward or upward. To successfully count the number of floors, a single image needs to be captured from the 30th floor to the 27th floor in case that the target floor is the 27th floor, and a single image needs to be captured from the 30th floor to the 15th floor in case that the target floor is the 15th floor. For this reason, the reference distance of the waypoint varies depending on the number of floors of the address.

The reference distance may vary depending on the characteristics of the camera mounted in the aircraft and configured to capture the image. For example, the reference distances for exploring the delivery area may be differently established in consideration of the image quality and/or the angle of view of the camera.

The waypoints may be represented by three-dimensional coordinates defined by latitude, longitude, and altitude. An altitude value of the waypoint may vary depending on the number of floors at the delivery location included in the address.

More specifically, the processor 430 may acquire height information of the building including the delivery location and determine the altitude value by comparing the number of floors at the delivery location included in the address with the height information.

For example, first altitude may be established in case that the 27th floor in the 30-story building is explored, and second altitude, which is lower than the first altitude, may be established in case that the 5th floor in the 30-story building is explored. The processor 430 controls the aircraft to lower the aircraft at the waypoint in case that the first altitude is established. The processor 430 controls the aircraft to raise the aircraft at the waypoint in case that the second altitude is established.

The processor 430 may receive the image of the delivery area at the waypoint captured by the aircraft (S1230), and the processor 430 may explore the delivery area by using the image (S1250). This is to more accurately and quickly explore, on the basis of the image, the delivery location to which the delivery product is to be delivered.

Figure 14:
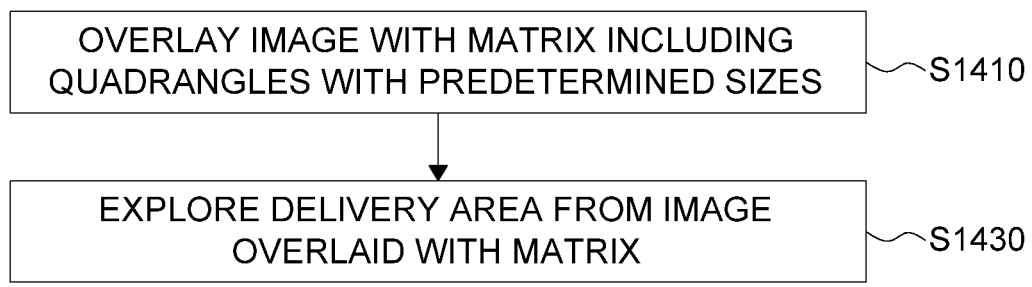
FIG. 14 is a flowchart for explaining a method of exploring a delivery area by using an image.
Figure 15A:
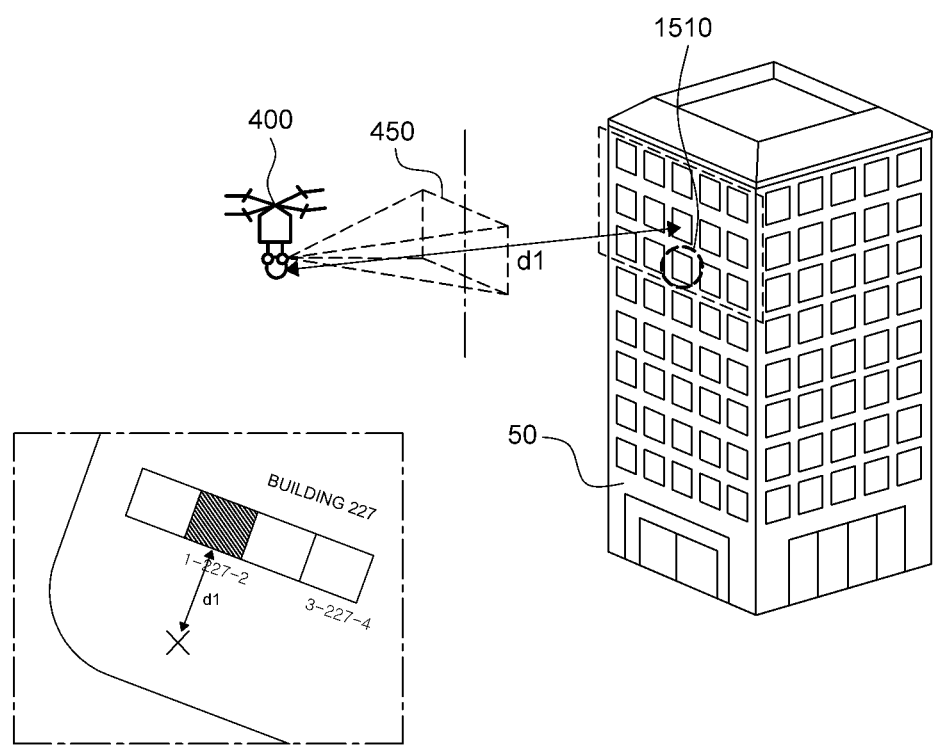
FIGS. 15A to 15C are exemplified views for explaining the method in FIG. 14.
Figure 15B:
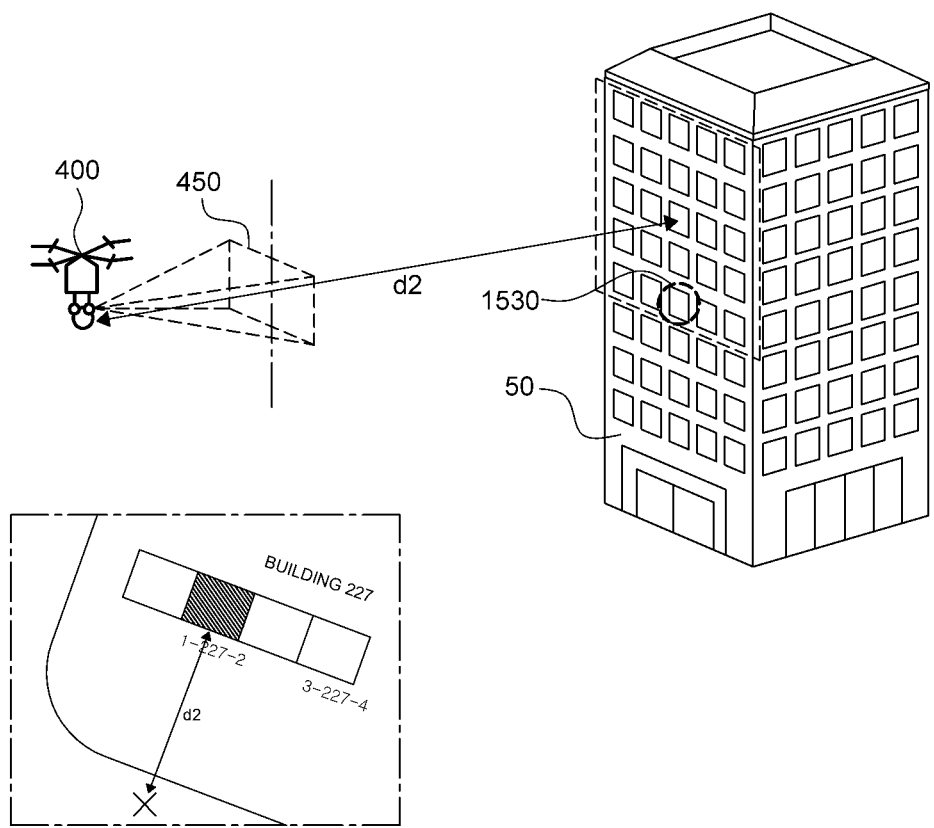
Figure 15C:
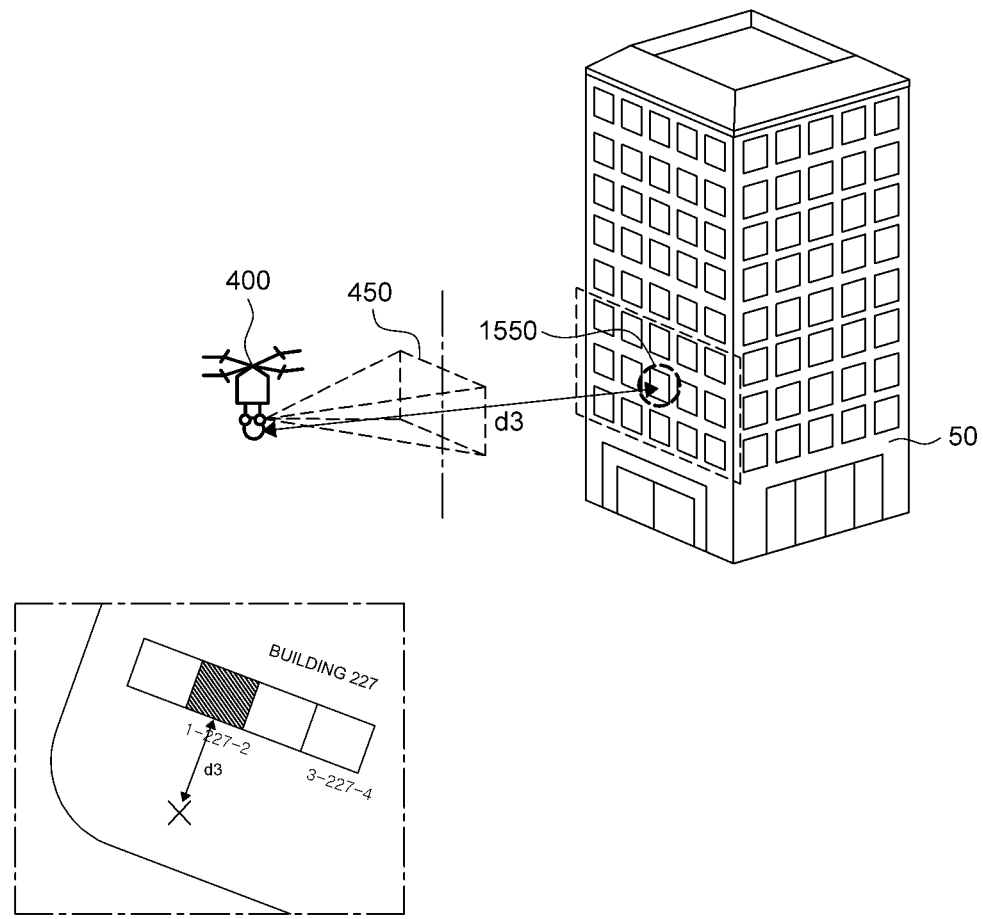

FIG. 14 is a flowchart for explaining a method of exploring a delivery area by using an image, and FIGS. 15A to 15C are exemplified views for explaining the method in FIG. 14.

The processor 430 may overlay a building image, which is captured at the waypoint, with a matrix including quadrangles with predetermined sizes (S1410).

The processor 430 may start counting from a reference quadrangle and explore the delivery area corresponding to any one quadrangle from the image overlaid with the matrix (S1430).

For example, as illustrated in FIG. 15A, the control apparatus 400 receives an image 450 of a building 50 captured at the waypoint and explores a target 1510 from the image 450. In this case, the matrix, in which a plurality of quadrangles is disposed in a mesh shape, overlaps the image 450, which makes it possible to more quickly explore the target 1510.

A predetermined size of the quadrangle varies depending on the address. More specifically, the processor 830 may use the address to identify the characteristics of the building such as veranda sizes, square footage of houses, and shapes of houses and produces a matrix for exploring the target. Further, the quadrangle corresponding to the target may be established in the matrix. The matrix overlaps the image, which makes it possible to more quickly and accurately explore the target.

The processor 430 may establish, on the basis of the address, the waypoint spaced apart from the delivery area at a reference distance. As illustrated in FIG. 15A, the waypoint, which is spaced apart from the delivery area at d1, may be established in case that a first target 1510 positioned at the first address is explored. As illustrated in FIG. 15B, the waypoint, which is spaced apart from the delivery area at d2, may be established in case that a second target 1530 positioned at the second address is explored.

The predetermined size of the quadrangle, which constitutes the matrix, varies depending on the position of the waypoint even in the case of the same building. For example, a quadrangle of a matrix applied to a first image captured at a first waypoint may have a first size, and a quadrangle of a matrix applied to a second image captured at a second waypoint may have a second size. The waypoint varies depending on the address, and thus the size of the matrix applied to the image varies. Therefore, a resource required to find the target may be minimized, and a battery may be more efficiently used.

Even in case that the processor 430 establishes the waypoints spaced apart from the delivery area at the same reference distance, the altitude of the waypoint may vary depending on the address. For example, d1 illustrated in FIG. 15A and d3 illustrated in FIG. 15C may be the same distance. However, the altitude of the respective waypoints may be set differently because the numbers of floors at the delivery locations are different. Because the specific description has been described with reference to FIGS. 12 to 13, the specific description will be omitted.

The present invention may be expanded to the aircraft having the control apparatus for an aircraft described with reference to FIGS. 8 to 15.

The present invention described above may be implemented as a computer-readable code (or application or software) on a medium on which a program is recorded. The control method for the autonomous driving aircraft may be implemented by the code stored in the memory and the like.

The computer-readable medium includes all kinds of storage devices for storing data readable by a computer system. Examples of the computer-readable media include hard disk drive (HDD), solid state disk (SSD), silicon disk drives (SDD), ROM, RAM, CD-ROM, magnetic tape, floppy disc, and optical data storage device and also include one implemented in the form of a carrier wave (e.g., transmission over the Internet). In addition, the computer may include a processor or a control unit. Therefore, it should be appreciated that the detailed description is interpreted as being illustrative in every aspects, not restrictive. The scope of the present invention should be determined based on the reasonable interpretation of the appended claims, and all of the modifications within the equivalent scope of the present invention belong to the scope of the present invention.

What is claimed is:

1. A control method for a control apparatus for an aircraft comprising a communication unit and a processor, the control method comprising:
   receiving an address of a delivery location to which a delivery product is to be delivered;
   controlling the aircraft by means of the communication unit to deliver the delivery product to the delivery location; and
   establishing a waypoint for the aircraft to explore a delivery area, by acquiring height information of a building including the delivery location and by determining an altitude value of the waypoint by comparing a number of floors at the delivery location included in the address with the height information,
   wherein the controlling of the aircraft by means of the communication unit comprises:
      selecting, based on the address, any one delivery criterion of a plurality of delivery criteria that defines an area into which the aircraft is to unload the delivery product;
      establishing the delivery area and a flight lane based on the delivery criterion;
      controlling the aircraft so that the aircraft flies along the flight lane; and
      controlling the aircraft to unload the delivery product into the delivery area when the aircraft reaches the delivery area.

2. The control method of claim 1, wherein the controlling of the aircraft by means of the communication unit further comprises:
   acquiring a map image including the delivery location;
   dividing at least one area of the map image into a plurality of areas; and
   establishing, based on the delivery criterion, at least one of the plurality of areas to the delivery area.

3. The control method of claim 2, further comprising:
   receiving sensing information related to the delivery area sensed by a sensor mounted in the aircraft;
   reestablishing the delivery area to a second area from a first area when the sensing information satisfies a reference condition; and
   controlling the aircraft to unload the delivery product into the second area instead of the first area.

4. The control method of claim 3, wherein the reestablishing of the delivery area to the second area comprises:
   exploring a predetermined area, which satisfies an unloading condition of the delivery product, by using the sensing information; and
   reestablishing the predetermined area to the second area.

5. The control method of claim 4, further comprising:
   establishing a new flight lane by using the sensing information when the predetermined area is not explored; and
   controlling the aircraft so that the aircraft flies along the new flight lane.

6. The control method of claim 4, wherein the predetermined area is a flat area where elevation of the land is within a predetermined range.

7. The control method of claim 4, wherein the unloading condition varies depending on the delivery product.

8. The control method of claim 3, wherein
   the sensing information is a captured image of the delivery area, and
   the delivery area is reestablished to the second area from the first area when an object, which makes delivery impossible, is explored from the image.

9. The control method of claim 3, further comprising:
controlling the aircraft so that the aircraft hovers at one point while reestablishing the delivery area.

10. The control method of claim 1, further comprising:
receiving terminal position information of a recipient who is scheduled to receive the delivery product,
wherein the delivery area varies depending on the terminal position information.

11. The control method of claim 10, further comprising:
establishing, based on the delivery location, a first area facing a first door and a second area facing a second door; and
establishing the first area or the second area to the delivery area based on the terminal position information.

12. The control method of claim 1, further comprising:
receiving an image of the delivery area captured at the waypoint by the aircraft; and
exploring the delivery area by using the image.

13. The control method of claim 1, wherein in the establishing of the waypoint,
the waypoint is included in the flight lane and is spaced apart from the delivery area at a reference distance based on the address, and
the reference distance varies depending on the number of floors at the delivery location included in the address.

14. The control method of claim 13, wherein in the establishing of the waypoint, the reference distance varies depending on characteristics of a camera mounted in the aircraft and configured to capture the image.

15. The control method of claim 1, wherein in the establishing of the waypoint,
the waypoint is represented by three-dimensional coordinates defined by latitude, longitude, and altitude, and
the altitude value of the waypoint varies depending on the number of floors at the delivery location included in the address.

16. A control apparatus for an aircraft that performs the control method of claim 1.

17. An aircraft controlled by the control method of claim 1.

18. A control method for a control apparatus for an aircraft comprising a communication unit and a processor, the control method comprising:
receiving an address of a delivery location to which a delivery product is to be delivered;
controlling the aircraft by means of the communication unit to deliver the delivery product to the delivery location;
establishing, based on the address, a waypoint that is spaced apart from a delivery area at a reference distance and is included in a flight lane;
receiving an image of the delivery area captured at the waypoint by the aircraft; and
exploring the delivery area by using the image,
wherein the controlling of the aircraft by means of the communication unit comprises:
selecting, based on the address, any one delivery criterion of a plurality of delivery criteria that defines an area into which the aircraft is to unload the delivery product;
establishing the delivery area and the flight lane based on the delivery criterion;
controlling the aircraft so that the aircraft flies along the flight lane; and
controlling the aircraft to unload the delivery product into the delivery area when the aircraft reaches the delivery area, and
wherein the exploring of the delivery area by using the image comprises:
overlaying the image with a matrix including quadrangles having predetermined sizes; and
starting counting from a reference quadrangle and exploring a delivery area corresponding to any one quadrangle from the image overlaid with the matrix.

19. The control method of claim 18, wherein the predetermined sizes vary depending on the address.

* * * * *